United States Patent [19]

Williams et al.

[11] 4,405,733
[45] Sep. 20, 1983

[54] COMPOSITE QUASI-CRYSTALLINE MATERIAL

[75] Inventors: David J. Williams; Gerald R. Meredith, both of Fairport; George R. Olin, Webster, all of N.Y.

[73] Assignee: Xerox Corporation, Stamford, Conn.

[21] Appl. No.: 289,594

[22] Filed: Aug. 3, 1981

[51] Int. Cl.³ .............................................. C08L 35/02
[52] U.S. Cl. ...................................... 524/87; 264/24; 430/345
[58] Field of Search ................... 524/89; 430/345; 264/1.3, 24

[56] References Cited

U.S. PATENT DOCUMENTS

| | | | |
|---|---|---|---|
| 3,867,571 | 2/1975 | Starkweather et al. | 178/7.6 |
| 3,922,485 | 11/1975 | Starkweather et al. | 178/7.6 |
| 3,938,881 | 2/1976 | Biegelsen et al. | 350/161 |
| 4,034,408 | 7/1977 | Starkweather | 358/293 |
| 4,040,096 | 8/1977 | Starkweather | 358/302 |
| 4,171,980 | 10/1979 | Ceintrey | 430/345 |
| 4,205,348 | 5/1980 | De Benedicts et al. | 358/285 |
| 4,213,157 | 7/1980 | De Benedicts et al. | 358/293 |
| 4,237,207 | 12/1980 | Ceintrey | 430/345 |

OTHER PUBLICATIONS

IBM Technical Disclosure Bulletin, vol. 14, No. 1, pp. 290–292, (Jun. 1971).
V. A. Krongauz, S. N. Fishman & E. S. Goldburt, "Quasi-Crystals Growth from Photochromic Spiropyrans in a Constant Electric Field", Journal of Physical Chemistry, 82(23): pp. 2469–2474, (1978).
Israel Journal of Chemistry 18: pp. 304–311, (1979).

*Primary Examiner*—Lewis T. Jacobs
*Attorney, Agent, or Firm*—Peter H. Kondo; John E. Beck; Ronald Zibelli

[57] ABSTRACT

A composite quasi-crystalline material made of a polymeric support matrix having disposed therein polar quasi-crystals of photochromic spiropyran complexes, believed to be of the formula $A_nB$, in which A represents the "colorless" photochromic spiropyran molecule and B represents the colored merocyanine form which is the photolysis product of A, and n is 2 or 3. The polar quasi-crystals are present in the composite material in a substantially polar aligned form. Methods for making the composite material are also disclosed.

19 Claims, 3 Drawing Figures

COMPOSITE QUASI-CRYSTALLINE MATERIAL

BACKGROUND OF THE INVENTION AND PRIOR ART STATEMENT

This invention relates to a novel composite quasi-crystalline material, and more particularly to a composite quasi-crystalline material which is useful in a variety of electro-optic uses.

It is known that information contained in a video signal may be used to modulate a substantially constant source of radiation such as a collimated beam of monochromatic light which may be generated by a laser device. Such modulated light beam may then be used to generate a visible image, such as through a video display unit, or it may be used to generate a latent electrostatic image on a recording surface, etc. In such uses, the electro-optical modulator typically may contain a Pockel's cell comprising, for example, a potassium di-hydrogen phosphate crystal, whose index of refraction is periodically varied by the application of the varying voltage which represents the video signal. See, for example, U.S. Pat. Nos. 3,867,571, 3,922,485, 4,034,408, and 4,040,096. These patents all deal with a scanning device known as flying spot scanner in which video information is communicated to a scanned medium by a scanning system which utilizes a multifaceted rotating polygon for controlling the scanning cycles. Aside from the potassium di-hydrogen phosphate crystal used in the Pockel's cell disclosed in those patents, other known materials which may be used in such electro-optical modulators include LiNbO₃, LiTaO₃, BSN, etc. These electro-optic modulators, which are sometimes referred to as light valves, have a wide number of uses. The property of these materials which make them useful in a device such as the Pockel's cell is their first non-linear polarization. The polarization of a material in an electric field may be described by the expression:

$$P = X^{(1)}E + X^{(2)}E^2 + X^{(3)}E^3 + \ldots$$

$$P = P^{(1)} + P^{(2)} + P^{(3)} + \ldots$$

in which P is the polarization of the material, E is the strength of the electric field applied, and X (Chi) is the coefficient of successive powers of the field. Since $X^{(n)}$ is usually about $10^6$ times the magnitude of $X^{(n+1)}$ when expressed in esus, successively higher orders of X (Chi) will only reveal themselves at progressively higher fields. With $P^{(1)}$ as the linear polarization, and $P^{(2)}$ as the first non-linear polarization, practically speaking, the coefficient $X^{(2)}$ is a measuure of the property of a material which may make it of use in an electro-optic device. In the electric dipole approximation, $X^{(2)}$ is zero in crystalline materials having a center of inversion or in non-crystalline materials with orientational averaging of molecular constituents.

The first non-linear polarization of a material in an electric field is a source of a number of important and practical optical effects. One of these effects is, as discussed above, the change in the refractive index of the material by the application of an electric field. Another effect is the conversion of light of frequency ω to a frequency 2ω. This effect is useful, for example, when an available laser has an output at a wavelength which is not particularly useful with a sensing or recording device, such as a xerographic photoreceptor, but where cutting the wavelength to one half its initial value would make the available laser useful. Thus, the output of a InGaAsP solid state laser, at 1500 nm, is not particularly useful with xerographic photoreceptors, but the conversion of this output to 750 nm would make it compatable with certain red sensitive photoreceptors. Other useful effects to be derived from non-linear polarization, such as frequency mixing, and optical rectification, as well as other effects such as pryoelectricity and piezoelectricity which can occur in media lacking inversion symmetry, will be appreciated by those skilled in the art in view of the present disclosure.

U.S. Pat. Nos. 3,938,881, 4,205,348, and 4,213,157 disclose acousto-optic modulation devices and/or laser scanning apparatus in which the composite material of the present invention also may be used.

IBM Technical Disclosure Bulletin, Vol. 14, No. 1, page 290-292 (June 1971), discloses a multi-monomolecular film materials for accoustic and optical devices, which is made of multiple layers of unimolecular film of certain organic materials supported on a substrate. The disclosure indicates that these films do not have a center of inversion, and they may be used as non-linear optical and accoustic guided wave devices.

It is also known that certain dye molecules, such as N-methyl-4'-hydroxy-4-stilbazolium betaine, a merocyanine dye molecule, has an extremely large molecular hyperpolarizibility. However, N-methyl-4'-hydroxy-4-stilbazolium betaine molecules in solution experience random orientation with the result that the first non-linear polarization of the solution as a whole is negligible. Other materials, such as 2-methyl-4-nitroaniliane exhibit large molecular hyperpolarizability as well as large values of $X^{(2)}$ (Chi), but it is difficult to grow good quality single crystals of such materials. The 2-methyl-4-nitroaniline is quite toxic and it does not lend itself to fabrication into optical devices.

Accordingly, it is an object of the present invention to provide a novel composite material having exceptional non-linear optical properties;

It is another object of the present invention to provide a method for making composite materials which possess non-linear optic and piezoelectric properties and which have a variety of practical uses.

These and other objects of the invention can be gathered from the following disclosure.

SUMMARY OF THE INVENTION

In accordance with the present invention, there is provided a novel composite quasi-crystalline material which is made of a polymeric support matrix having disposed therein polar quasi-crystals of photochromic spiropyran complexes, believed to be of the formula $A_nB$, in which A represents the "colorless" photochromic spiropyran molecule and B represents the colored merocyanine form which is the product from photo-induced ring opening of A at the spiro carbon tom of A, n being 2 or 3, the polar quasi-crystals being present in the polymeric support matrix in a substantially polar aligned form.

DETAILED DESCRIPTION OF THE INVENTION

Figure 1:
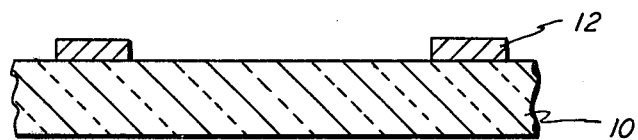

As indicated above, in accordance with the present invention, a composite material having a large first non-linear polarization and being suitable for a variety of electro-optic uses is provided which is made of polar quasi-crystals of photochromic spiropyran complexes disposed in a polymeric support matrix, with the polar quasi-crystals being substantially polar aligned within the polymer support matrix. With the quasi-crystals thus polar aligned, the composite material of the present invention does not have a center of inversion and it possesses non-linear optical and piezoelectric properties. The composite material of the present invention possesses the further advantage that it is able to transmit light in the visible region. In addition, the index of refraction of the polymeric support matrix material in the composite material of the present invention can be adjusted to closely match the index of refraction of the quasi-crystals at zero applied electric field or at a predetermined level of applied electric field. This can be accomplished by incorporating one or more dyes into the polymeric support matrix material by the so called normal dispersion, as contrasted to anomalous dispersion, associated with the visible optical absorption peak to alter the refractive index at the desired wavelength.

The photochromic spiropyran complexes in the composite material of the present invention have the general formula $A_nB$, in which A represents the "colorless" photochromic spiropyran molecule and B represents the colored merocyanine form which is the photochemical transformation product of A, and n being 2 or 3. In particular, a family of photochromic spiropyrans known as indolinobenzospiropyrans are suitable for the purposes of the present invention. For indolinobenzospiropyrans, the basic photochromic reaction in the reversable opening of the pyran ring in the pyran form of the molecule ("A") to obtain the merocyanine form ("B") is:

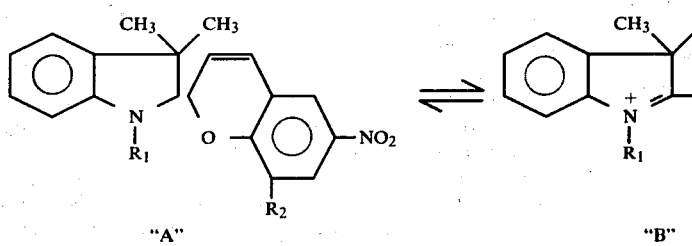

The above reversable reaction, as well as the synthesis of a particular indolinobenzospiropyran, 1-(β-methacryloxyethyl)-3,3-dimethyl-6'-nitrospiro(indoline-2,2'-[2H-1]benzopyran), have been reported in V. A. Krongauz, S. N. Fishman, and E. S. Goldburt, *Quasi-Crystals Growth from Photochromic Spiropyrans on Irradiation in a Constant Electric Field.* In Journal of Physical Chemistry, 82(23): p. 2469–2474 (1978). See also V. A. Krongauz, *Quasi-Crystals.* In Israel Journal of Chemistry. 18: pages 304–311(1979). We have synthesized this benzospiropyran by the following four-step synthesis procedure:

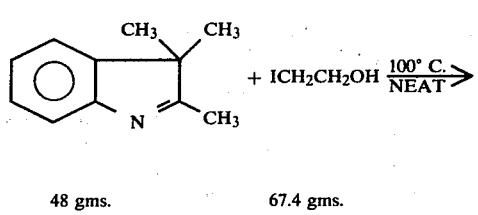

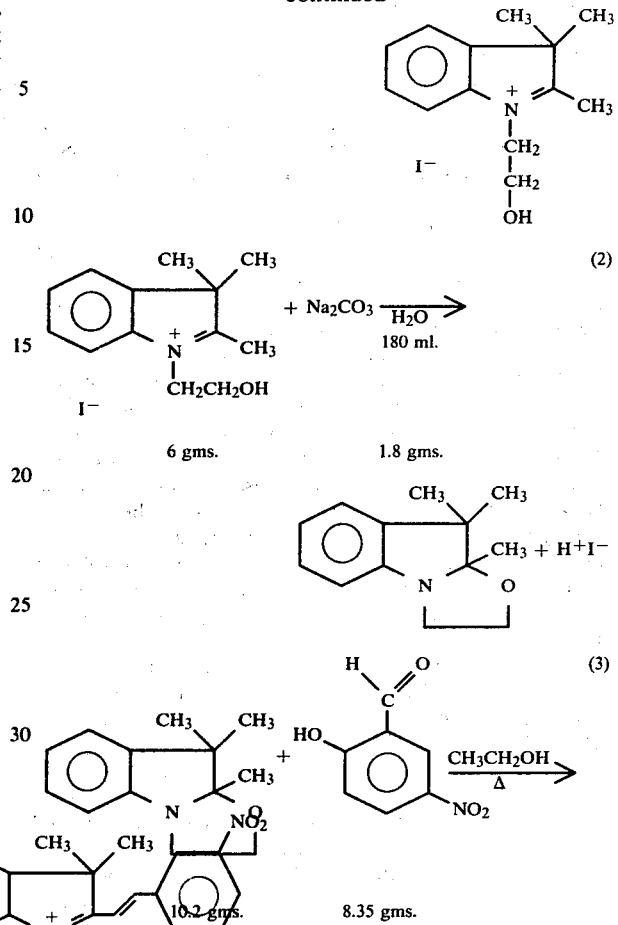

-continued

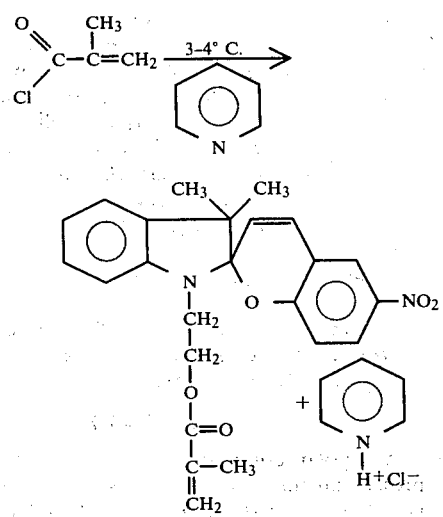

The product from the fourth step in the above synthesis procedure was 1-(β-methacryloxyethyl)-3,3-dimethyl-6'-nitrospiro-(indoline-2,2'-[2H-1]benzopyran), which corresponded to the compound "A" in the above reversible pyran ring opening equation, was purified on a silicic acid column and recrystallized from a solution using as the solvent a mixture of benzene and hexane in the ratio of 1:10. Various other spiropyrans with different substituents on the nitrogen atom may be made utilizing the above outlined procedure.

The formation of the quasi-crystals useful in making the composite material of the present invention is also generally disclosed in the two articles cited above. In particular, we have prepared quasi-crystals by the following procedure: A $5 \times 10^{-4}$ molar solution of the benzospiropyran ("A") in methylcyclohexane solvent was placed in a quartz cell between two stainless steel electrodes separated by spacers of 0.3 cm thick Teflon. An electric field of 8 KV/cm was applied by placing 2400 volts across the stainless steel electrodes. The solution was irradiated for about 60 seconds while being subjected to the electric field. The incident light employed for the irradiation was in a direction normal to the electric field, and the light was from a 1000 watt high pressure mercury-xenon arc lamp filtered by a 10 cm water thermal filter and a Corning 7-39 glass filter passing light from 300 to 400 nm with an intensity of about 25 mW/cm$^2$. After about 60 seconds of the irradiation with the electric field on, threads of quasi-crystals can be visually seen stretching from electrode to electrode along the electric field lines. Microscopic examination of these threads showed quasi-crystalline "string-of-beads" permanent dipole structure, with individual "bead" size of about 1 micron. It is believed that the "beads" or globules in the threads are composed of highly ordered molecular aggregates of A$_n$B (n is 2 or 3) in their center portions, and relatively amorphous composition of AB in their exterior regions.

To be practically useful, the quasi-crystals are to be made into the composite materials of the present invention. This may be done by placing or disposing the quasi-crystals in a polymeric support matrix, while having the quasi-crystals in a substantially polar aligned form. When the quasi-crystals are employed in the thread form indicated above, the globules in the threads are in the polar aligned form. The quasi-crystals also may be made in individual globules, not strung together in the thread form, and yet having polar alignment, as shown in FIG. 7 on page 308 of said Krongauz article in the Isreal Journal of Chemistry. Such polar aligned individual globules, which also may be used in the composite material herein, are made by the use of an electric field at a lower strength than that for making the threads. Alternatively, the globules may be made in the non-polar aligned form (see FIG. 7 of Krongauz, supra), disposed in the polymeric support matrix material, and then the quasi-crystals may be polar aligned by the application of a sufficient electric field. This method for aligning the quasi-crystals in situ is best carried out when the polymeric support matrix material is in a yieldable state. Although the composite material of the present invention can be made by disposing unaligned quasi-crystals in the polymeric support matrix material, permitting the support matrix to harden or solidify, and then align the quasi-crystals by the use of a sufficient electric field, such a method is not preferred.

The polymeric support matrix material which may be used for the purposes of the invention include thermoplastic materials, thermoset materials, photoresist materials and films produced by the deposition of an organic material from a vapor or plasma stream. Examples of suitable thermoplastic materials include: polyisobutene; polychloroprene; poly(1-methoxybutadiene); poly(5,7-dimethyl-1,6-octadiene); atactic polypropylene; low molecular weight polyethylene; polycyclopentylethylene; polycyclohexylethylene; poly(3-cyclohexyl-1-propene); poly(4-cyclohexyl-1-butene); poly(5-cyclohexyl-1-pentene); poly(diphenyldiacetylene); poly(vinylcaprylate); poly(vinyllaurate); poly(vinylpalmitate); poly(vinyl n-butyl ether); poly(vinyl isobutylether); atactic polystyrene; poly(n-butylacrylate); poly(n-butylmethacrylate); poly(iso-butylmethacrylate); poly(tert-butylcrotonate); and polycyclohexene oxide. Examples of suitable thermoset materials include: phenol aldehyde resins; epoxy resins; urea formaldehyde resins; melamine formaldehyde resins; and polyester or alkyl resins. Examples of suitable photoresist materials include: Kodal KAR-3; GAF Microline PR-102; Dynachem PRS-175; Shipley AZ-111; certain polyvinyl cinnamate derivates; certain vinylester containing cinnamylidene; certain alkyl ester prepolymers; etc.

One procedure for disposing the quasi-crystals within the polymeric support matrix materials will now be described with reference to the drawings.

Figure 2:
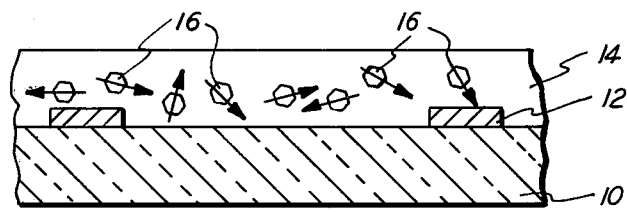
Figure 3:
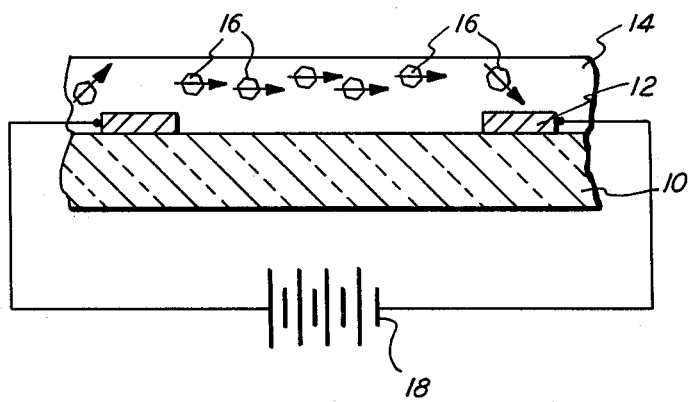

In FIGS. 1-3, one procedure for making the composite material of the present invention is illustrated. Referring to FIG. 1, it is seen that a substrate 10 is provided which may be made of silicon, gallium arsenite, glass, etc. On substrate 10, a pair of electrodes 12, in the form of patters, are positioned an appropriate distance apart, for example 1 mm.

The silicon substrate shown in the structure of FIG. 1 may be present in the form of a plain and substantially uniform layer (for example, when the device is to be used as a wave guide) or the silicon substrate may have been fabricated by techniques known in the art, into microcircuits for use in subsequently controlling the electric field in the composite material formed thereon. Alternatively, the substrate may be made of a neutral material such as glass or the same polymeric material used as the polymeric support matrix. The composite material of the present invention may be made by depositing a layer 14 of a dispersion on the substrate 10, as shown in FIG. 2. The dispersion 14 is made by dispersing the quasi-crystals 16, prepared as indicated above, in a solution of the polymeric support matrix material in a non-polar solvent. The solution may be made, for example, by dissolving 1 to 10 percent of polyisobutyl methacrylate in methylcyclohexane. The amount of the quasi-crystals used may be varied, but we prefer to use about 10 to 20 percent by weight of the polymeric support matrix material employed. The thickness of the layer 14 may also be varied over a wide range, depending on the use to which the end device is intended, but we prefer to make the layer 14 about 1 to 5 microns in thickness. The substrate 10 also may be made of any desired thickness, for example, 1 to 50 microns.

The layer 14 may be deposited onto substrate 10 by any known means. We prefer to use a solvent coating method, such as spin coating or dip coating. After the layer 14 is formed on the substrate 10, it is permitted to dry. The polarity of the quasi-crystals 16 in such a dried layer 14 would have random orientation as shown by the small arrows in the quasi-crystals in FIG. 2. The orientation of the quasi-crystals is illustrated in FIG. 3.

In FIG. 3, the thermoplastic layer 14 is heated to soften the polymeric support matrix material and an electric field is applied between the two electrodes 12 by means of a source of electric potential 18. As shown by the small arrows in the quasi-crystals 16 in FIG. 3, the application of the electric field causes the polarity of the crystals to follow the lines of the electric field. The alignment of the quasi-crystals in layer 14 is then frozen in place by cooling the layer 14 while still under the influence of the electric field.

An alternative method for making the composite material is to replace the dispersion of layer 14 in FIG. 2 with a solution of the benzospiropyran ("A") and the polyisobutyl methacrylate in methycyclohexane, and apply the electric field necessary for the synthesis of the threads of the quasi-crystals or "string-of-beads" permanent dipole structure in-situ. After such threads of the quasi-crystalline material is produced in-situ, the solvent methylcyclohexane may be evaporated to result in the composite material of the present invention.

When thermosetting polymeric materials are employed as the polymeric support matrix material, the above procedures for making the composite material of the present invention may be employed. The thermosetting material is cross-linked and hardened in the presence of the applied electric field to maintin the quasi-crystals in the aligned form.

When photoresist material is used as the polymeric support matrix material in the composite material of the present invention, the procedure for preparing the composite material is essentially the same as that for the thermoplastic and thermosetting materials, except that after the quasi-crystals are disposed in the photoresist material and aligned by the application of an electric field, the structure is then exposed to activating radiation through a photoresist mask and the exposed photoresist is then developed according to known techniques.

As indicated above, certain dyes may be incorporated in the polymeric support matrix material to adjust its refractive index to closely match that of the quasi-crystals. The dyes which can be so used are known to those skilled in the art and they include: α-naphtholphthalein (648 nm); Naphthol Green B (714 nm)(Color Index 10020); 1,1'-diethyl-4,4'-carbocyanine iodide (703 nm); Malachite Green (615 nm)(C.I. 42000); Brilliant Green (625 nm)(C.I. 42040); Crystal Violet (588 nm)(C.I. 42555); Azure A (633 nm)(C.I. 52005); Azure B (648 nm)(C.I. 52010); Acid Green 27 (605 nm)(C.I. 61580); Acid Green 41 (680 nm)(C.I. 62560): Oil Blue N (637 nm)(C.I. 61555); and Disperse Blue 1 (6500 nm)(C.I. 64500). The amount of dye to be employed depends on the nature of the polymeric support matrix material and the dye, as well as the quasi-crystalline material. We have found, for example, about 0.1 to 10 parts dye in 100 parts of polyisobutylmethacrylate to be suitable, when used with 1-($\beta$-methacryloxyethyl)-3,3-dimethyl-6'-nitrospiro-(indoline-2,2'[2H-1]benzopyran). When Naphthol Green B is used, about 1 part of the dye per 100 part of the polymeric support matrix material is very suitable.

The invention will now be further particularly described with reference to the making and using of a specific composite material.

EXAMPLE

A dipolar composite film in accordance with the present invention was prepared in the following manner. A $5 \times 10^{-4}$ M solution of 1-($\beta$-methacryloxyethyl)-3,3-dimethyl-6'-nitrospiro-(indoline-2,2'[2H-1]benzopyran) in methylcyclohexane was prepared. A pair of rectangular brass electrodes approximately 1 cm in length and 1 mm $\times$ 1 mm cross-section was contacted with the surface of a pyrex microscope slide spaced 1 mm apart. A drop of the above solution was placed between the electrodes and held there by capillary action. A potential drop of 150 volts was applied across the electrodes. The sample was irradiated for about 30 seconds with the collimated output of a 75 Watt Hg/Xe arc lamp with a Corning CS-74 filter. After irradiation the solvent was allowed to evaporate leaving a thin layer of aligned "quasi-crystalline" threads between the electrodes on the glass surface. The applied voltage and the electrodes were then removed from the surface.

The slide was placed in the beam of a Q-switched $Nd^{3+}$/YAG laser which produced 1 mj pulses of 1.06$\mu$ light of 20 nsec duration at 10 Hz repetition rate. The resulting 532 nm harmonic was detected by an EMI 9558Q photomultiplier placed behind a monochromator and Schott KG-3 filtering assembly for effective f/16 collection optics centered on the laser beam. A 20-fold increase in detected harmonic was achieved by covering the threads with a low vapor pressure liquid such as dodecane or petroleum jelly (Vaseline) with a cover slip placed over this combination. This is interpreted as an increase both in harmonic generation and in collection efficiency. These increases are due to decrease of refractive index variations at the thread boundaries which reduces scattering and deformation of the laser beam and which enhances beam-like, as opposed to diffuse harmonic, emission and reduces scatter by overlying threads.

The threads on the slide were relatively easily disturbed or broken by physical contact. It was also found that the dodecane and petroleum jelly, over a substantial period of time, would "dissolve" or disturb the crystalline threads. The encapsulation of the threads without physical disturbance by the encapsulation process itself was difficult but we have found the following procedure to be very suitable.

A polymer composite was obtained by spin coating a 10% methylcyclohexane solution of poly(isobutylmethacrylate)(Mn=140,000, Mw=300,000) onto the surface of the threads on glass. The thread structure was completely covered with solution and immediately spun at 500 RPM for 2 minutes on a Headway Research Photoresist Spinner Model EC101. The high quality film that was obtained was a composite of aligned threads in polymer.

Second harmonic generation by the composite was investigated as described above with the polymer coating acting to reduce the refractive index mismatch around the threads. Generation was found to be highly uniform over the film by positioning various portions in the laser beam. Furthermore, study of the electric polarization vector dependences revealed by far the maximum harmonic to be produced from laser light polarized parallel to the threads and emitted into the same polarization. This shows the essential nature of the preservation of the external field induced dipolar alignment which is preserved in these films by formation of threads.

The invention has been described with reference to specific and preferred embodiments, it will be appreciated that various modifications may be made from the specific details without departing from the spirit and scope of the invention.

We claim:

1. A composite material which comprises:
   (a) polar quasi-crystals of photochromic spiropyran complexes of the formula $A_nB$, wherein A represents the uncolored photochromic spiropyran molecule and B represents the colored merocyanine form which is the product from photo-induced ring opening of A at the spiro carbon atom, and n is 2 or 3; and
   (b) a polymeric support matrix; said polar quasi-crystals being present within said polymeric support matrix in a substantially polar aligned form.

2. A composite material according to claim 1 wherein said photochromic spiropyran is an indolinobenzospiropyran.

3. A composite material according to claim 2 wherein A is

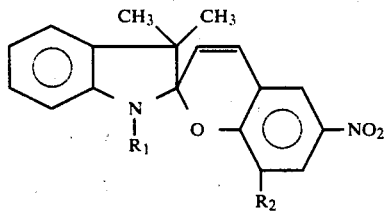

and B is

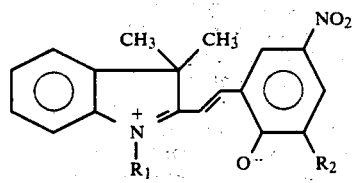

n is 2, and in which $R_1$ and $R_2$ may be the same or different radicals and selected from H, $CH_3CH_2$, $CH_3$, $CH_2CH_2OH$, and $CH_2CH_2OCOCCH_3-CH_2$.

4. A composite material according to claim 3 wherein said polymeric support matrix material comprises a thermoplastic material or a thermoset material.

5. A composite material according to claim 3 wherein A is

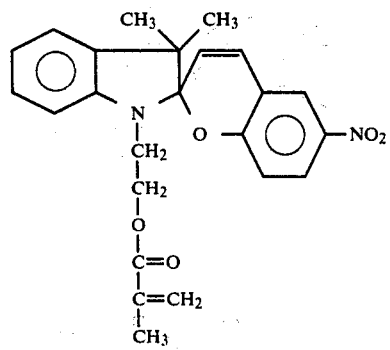

and B is

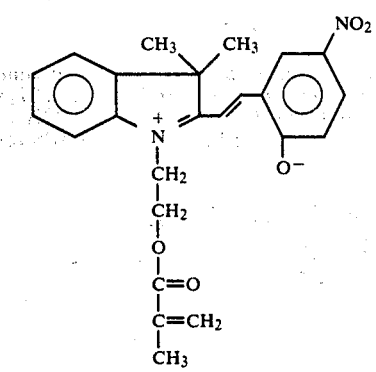

6. A composite material according to claim 3 wherein said polymeric support matrix is selected from polyisobutene, atactic polypropylene, polyethylene, polycyclopentylethylene, polycyclohexylethylene, poly(3-cyclohexyl-1-propene), poly(4-cyclohexyl-1-butene), poly(5-cyclohexyl-1-pentene), polybutadiene, polychloroprene 1,4-cis; polychloroprene, poly(1methoxybutadiene), poly(5,7-dimethyl-1,6-octadiene), poly(diphenyldiacetylene), poly(vinylcaprylate), poly(vinyllaurate), poly(vinylpolmitate), poly(vinyl n-butyl ether), poly(vinyl isobutyl ether), polystyrene, poly(n-butylacrylate), poly(n-butylmethacrylate), poly(isobutylmethocrylate), poly(tertbutylcrotonate), polycyclohexene oxide, and polydimethylsiloxane.

7. A composite material according to claim 4 wherein said polymeric support material is polyisobutylmethacrylate.

8. A method for making the composite material of claim 1 which comprises:
   providing said polar quasi-crystals of photochromic spiropyran complexes of the formula $A_nB$;
   providing a polymeric support matrix material;
   incorporating said polar quasi-crystals into said polymeric support matrix material while maintaining said polymeric support matrix in a yieldable state; and
   permitting said polymeric support matrix to change from said yieldable state to its normal ambient state;
   said quasi-crystals being caused to be in polar aligned form prior to permitting said polymeric support matrix to change from said yielding state to its normal ambient state.

9. A method according to claim 8 wherein A is

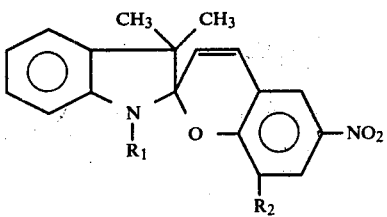

and B is

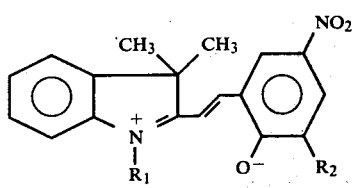

n is 2 and in which $R_1$ and $R_2$ may be the same or different radicals and selected from H, $CH_3$, $CH_2CH_3$, $CH_2CH_2OH$, and $CH_2CH_2OCOCCH_3$—$CH_2$.

10. A method according to claim 9 wherein A is

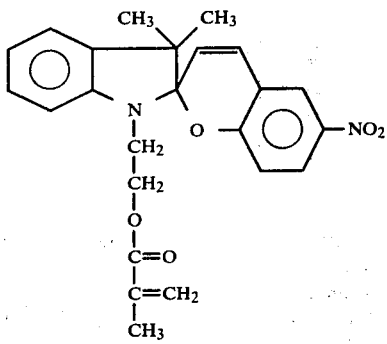

and B is

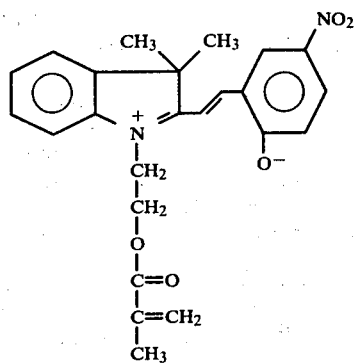

11. A method according to claim 9 wherein said polymeric support matrix comprises a thermoplastic material or a thermoset material.

12. A method according to claim 9 wherein said polymeric support matrix is a photoresist material.

13. A method according to claim 9 wherein said polymeric support matrix material is selected from polyisobutene, atactic polypropylene, polyethylene, polycyclopentylethylene, polycyclohexylethylene, poly(3-cyclohexyl-1-propene), poly(4-cyclohexyl-1-butene), poly(5-cyclohexyl-1-pentene), polybutadiene, polychloroprene 1,4-cis: polychloroprene, poly(1-methoxyutadiene), poly(5,7-dimethyl-1,6-octadiene), poly(diphenyldiacetylene), poly(vinylcaprylate), poly(vinyllaurate), poly(vinylpolmitate), poly(vinyl n-butyl ether), poly(vinyl isobutyl ether), polystyrene, poly(-n-butylacrylate), poly(n-butylmethacrylate), poly(isobutylmethocrylate), poly(tert-butylcrotonate), polycyclohexene oxide, and polydimethylsiloxane.

14. A method according to claim 10 wherein said polymeric support matrix material is polyisobutylmethacrylate.

15. A method according to claim 9 further comprising dispersing a dye in said polymeric support matrix material prior to the application of said electric field, said dye being selected to adjust the refractive index of the polymeric support matrix to substantially equal the refractive index of said polar quasi-crystals.

16. A method according to claim 9 wherein said polymeric support matrix material is a thermoplastic material and it is maintained in a yieldable state by heating to a point above its glass transition temperature, and wherein said polymeric support matrix is permitted to change from the yieldable state to its normal ambient state by cooling to below its glass transition temperature.

17. A method according to claim 9 wherein said polymeric support matrix material is a thermosetting material and it is yieldable while uncrosslinked, and it is changed from its yieldable state to its normal ambient state by crosslinking reaction.

18. A composite material which comprises:
(a) polar quasi-crystals of photochromic spiropyran complexes of the formula $A_nB$, wherein A represents the uncolored photochromic spiropyran molecule

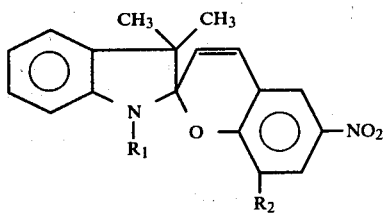

B represents the colored merocyanine form

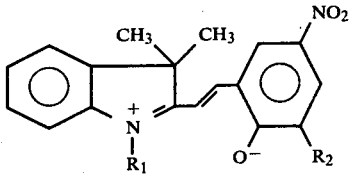

which is the product from photo-induced ring opening of A at the spiro carbon atom, n is 2 or 3, and $R_1$ and $R_2$ may be the same or different radicals and selected from H, $CH_3CH_2$, $CH_3CH_2OH$, and $CH_2CH_2OCOCCH_3$—$CH_2$;

(b) a polymeric support matrix, said polar quasi-crystals being present within said polymeric support matrix in a substantially polar aligned form; and (c) a dye dispersed in said polymeric support matrix, said dye being selected to adjust the refractive index of the polymeric support material to substantially equal the refractive index of said polar quasi-crystals.

19. A composite material according to claim 18 wherein said polymeric support matrix further contains Naphthol Green B dispersed therein, said Naphthol Green B being present in an amount about 1 percent by weight of said polymeric support matrix.

* * * * *